3,654,087
METHOD OF PRODUCING AMYLO-
1,6-GLUCOSIDASE
Lowell E. Coker and Almerin W. Turner, Decatur, Ill.,
assignors to A. E. Staley Manufacturing Company,
Decatur, Ill.
No Drawing. Filed Oct. 22, 1969, Ser. No. 868,571
Int. Cl. C12d 13/10
U.S. Cl. 195—65                                    7 Claims

ABSTRACT OF THE DISCLOSURE

Method of producing amylo-1,6-glucosidase, wherein an inoculum of a culture capable of producing amylo-1,6-glucosidase, is propagated without forming enzyme in an aqueous medium substantially free of maltose, maltotriose and pullulan comprising dextrose as the principal carbohydrate source and inducing the cells to form amylo-1,6-glucosidase in an aqueous medium containing maltose, maltotriose or pullulan.

DISCLOSURE OF THE INVENTION

This invention relates to a method of producing amylo-1,6-glucosidase, wherein an inoculum of a culture capable of producing amylo-1,6-glucosidase, is propagated without forming enzyme in an aqueous medium substantially free of maltose, maltotriose and pullulan comprising dextrose as the principal carbohydrate source and inducing the cells to form amylo-1,6-glucosidase in an aqueous medium containing maltose, maltotriose or pullulan.

It is well known that millions of pounds of starch are converted each year into syrups and crystalline products by treatment with acids and/or enzymes. Due to the large quantities of enzymes or hydrolases employed in these processes, enzymes producers have developed various techniques for optimizing the yield of enzyme from cultures. Generally speaking, the starch hydrolases are produced by a two-stage process. In the first stage, usually called the "propagation stage," a small inoculum of culture is added to a suitable carbohydrate-protein source designed to encourage the propagation and growth of a large population of cells capable of producing the desired hydrolase without actually forming hydrolase. Cells resulting from the propagation of the inoculum are added to a second carbohydrate-protein source designed to produce an optimum concentration of the desired hydrolase. This stage is usually called the "production stage."

In the last ten years scientists have succeeded in isolating amylo-1,6-glucosidase from certain bacterial cultures. This enzyme, often called pullulanase, is capable of debranching starch and is normally produced in a one or two-step process. For example in a two-step process, amylo-1,6-glucosidase is prepared by adding a small inoculum of a culture isolated from a strain of Aerobacter aerogenes to a medium containing a protein-carbohydrate source, where the carbohydrate source contains maltose, maltotriose or pullulan. Due to the fact that the carbohydrate source (maltose, maltotriose and pullulan) employed in this first step acts both as an inducing substrate for the production of amylo-1,6-glucosidase and as a carbon and energy source for cell growth and propagation, the first stage of the process is not specific to the growth and propagation of cells. Accordingly, the first stage of the process does not provide the maximum population of cells capable of producing amylo-1,6-glucosidase. After the inoculum is built up, the cells are added to a second vessel containing a suitable carbohydrate-protein source to produce the desired amylo-1,6-glucosidase.

The object of this invention is to provide a process for producing amylo-1,6-glucosidase from a suitable culture, wherein substantially no amylo-1,6-glucosidase is produced initially during the cell growth or propagation stage and large quantities of amylo-1,6-glucosidase are produced subsequently after inducing the cells to form amylo-1,6-glucosidase.

We have now found that is is possible to prevent the production of amylo-1,6-glucosidase in the first stage of the aforesaid process by employing dextrose initially as the principal carbohydrate source in the substantial absence of maltose, maltotriose and pullulan. Dextrose, which is a suitable substrate for the propagation of a large population of cells capable of producing amylo-1,6-glucosidase, is incapable of inducing the cells to produce amylo-1,6-glucosidase in the absence of maltose, maltotriose or pullulan. Accordingly, the first stage of our process produces a large population of cells and no enzyme. At this point the dextrose-repressed cells comprise a population of cells physiologically identical with respect to the ability to produce amylo-1,6-glucosidase, that is, none of the cells can produce enzyme. Subsequently, these cells are induced to produce amylo-1,6-glucosidase with maltose, maltotriose or pullulan which are inducers. Any of these can be employed alone or in conjunction with the other inducers or in conjunction with other suitable carbohydrate sources. Simultaneous induction of the entire cell population occurs upon the addition of a sufficiently high concentration of inducers to the repressed population or upon transfer of fully repressed cells to a medium already containing the optimal concentration of inducer. We believe that the multi-stage process of this invention leads to optimum or maximum production of amylo-1,6-glucosidase.

Briefly, amylo-1,6-glucosidase is produced by inoculating an aqueous nitrogen-dextrose substrate with cells from a stock culture capable of producing amylo-1,6-glucosidase, incubing the mesophilic cells for a time suitable to increase the cell population, adding the propagated cells to an aqueous nitrogen-carbohydrate inducing substrate and incubating for sufficient time to induce the cells to produce amylo-1,6-glucosidase. After induction, the induced cells can be added to a third or production medium or the induction medium can be employed as the production medium. Stated a different way, our process employs three stages, namely propagation, induction and production, the latter two stages being susceptible of being carried out in the same or different medium.

The amylo-1,6-glucosidase cultures used in this invention include any amylo-1,6-glucosidase preparation, such as those reported by Bender & Wallenfels in *Biochemische Zeitschrift*, vol. 334, pages 79–95 (1961). Other information covering the use and production of this enzyme can be found in Methods of Enzymology, vol. 8, pages 555–559 (1966). According to the above references, amylo-1,6-glucosidase can be readily obtained from the organism *Aerobacter aerogenes*. Certain strains of the organism, *Aerobacter aerogenes*, have been reported to be particularly good sources for obtaining this enzyme. For example, *Aerobacter aerogenes* (U-58), which is believed to be a direct descendant of the original strain isolated by Bender & Wallenfels, has been found to be a particularly good source of this enzyme. Various ultraviolet induced mutants of *Aerobacter aerogenes* (U-58) can also be used. Other reported strains of *Aerobacter aerogenes* which can be used include *Aerobacter aerogenes* ATCC 9621 and ATCC 15050.

The first stage of the present invention comprises adding scrapings of a stock culture capable of producing amylo-1,6-glucosidase (*Aerobacter aerogenes*) to an aqueous nitrogen-dextrose substrate. The dextrose, which prevents the production of amylo-1,6-glucosidase and which serves as a carbon source for cell propagation, can be present in a concentration of 0.1 to 10% by weight of the aqueous substrate, preferably 0.4 to 2.5% by weight. If the substrate contains too little dextrose, there will be insufficient cell growth. On the other hand, if there is too much dextrose, the dextrose may interfere in the second stage with the production of amylo-1,6-glucosidase. While the nitrogen source is generally protein, ammonia or ammonium salts may be employed.

The cells are incubated at a pH of about 5.0 to 8.5, preferably 5.8 to 8.0, at from about 5° C. to 45° C., preferably 20 to 35° C., for about 10 to 72 hours, preferably 12 to 24 hours, during which time the number of cells increases by about 50,000 fold. If the pH or temperature varies from the above ranges, cell propagation stops or is severely retarded. If incubation is carried out for less than 10 hours, an insufficient population of cells is provided in the first stage. On the other hand, if cell propagation is carried out for more than 72 hours, there is a tendency for deterioration of the cells and lower yields of amylo-1,6-glucosidase.

In the second stage of the present invention, which we call the "induction stage" the cells are induced to produce amylo-1,6-glucosidase by adding the cells to an aqueous nitrogen (protein, ammonia or ammonium salts) substrate containing an inducing carbohydrate (maltose, maltotriose or pullulan) in a concentration sufficient to induce the production of amylo-1,6-glucosidase and overcome the inhibiting effect of dextrose, i.e., in an inducing concentration. The substrate should contain at least 0.4% by weight, preferably at least about 0.5% by weight, maltose, maltotriose and/or pullulan in order to induce the production of amylo-1,6-glucosidase. The composition is then incubated at about 5° C. to about 45° C., preferably 20 to 35° C., to produce amylo-1,6-glucosidase. The substrate must be maintained at pH 5.0 to 8.5, preferably 6.1 to 7.9. In order to produce enzyme, the pH must be maintained at pH 6.0 to 8.1, preferably 6.1 to 7.9. Failure to operate within this range results in the cessation of amylo-1,6-glucosidase production and amylo-1,6-glucosidase production is not resumed merely by adjusting the pH to the designated range.

In a preferred embodiment of this invention, the organism produced in the second or induction stage is added to a third or production vessel after incubating in the induction stage for about 2 to 24 hours, preferably 4 to 8 hours, during which time a suitable number of cell divisions take place. If incubation is carried out for more than 24 hours in the second stage without addition to the third nitrogen-carbohydrate substrate, the cells capable of producing amylo-1,6-glucosidase, formed in the second stage, start to deteriorate. In the third stage, substantially the same conditions are employed as in the second stage except that the pH must be maintained at 6.0 to 8.1, preferably 6.1 to 7.9. It is also preferred to aerate by bubbling air through the medium. The carbohydrate employed during this stage can be any one of the inducing carbohydrates (maltose, maltotriose and/or pullulan) or amylopectin from any source, such as waxy maize or fractionated corn starch, etc. Dextrose is preferably avoided, since it tends to retard the production of amylo-1,6-glucosidase.

The amylo-1,6-glucosidase can be isolated and/or purified by any means employed for isolating amylo-1,6-glucosidase prepared by other processes.

The example following is merely illustrative and should not be construed as limiting the scope of the invention.

EXAMPLE I

Cells from a stock culture of *Aerobacter aerogenes* were loop-inoculated into 100 mls. of an aqueous pH 7.0 substrate containing 0.3% by weight Bacto-Meat Extract, 0.3% by weight bacto-peptone, 0.07% by weight sodium chloride, 0.07% $K_2HPO_4$ and 0.5% by weight dextrose. The cells were incubated on a rotary shaker at room temperature for about 16 hours forming a stationary phase population of approximately $5 \times 10^9$ cells per ml. At this point the repressed cells were incapable of producing amylo-1,6-glucosidase and none of the enzyme could be detected in the medium.

Two milliliters of the dextrose repressed cells were transferred to each of 5 Delong culture flasks containing 100 mls. of an aqueous pH 7.0 inducing substrate containing 0.3% by weight Bacto-Meat Extract, 0.3% by weight Bacto-Peptone, 0.07% by weight sodium chloride, 0.07% by weight $K_2HPO_4$ and 1% by weight maltose. This substrate, which was identical to the substrate employed in the first stage except that the dextrose was replaced with twice the concentration of maltose, contained $5 \times 10^7$ cells per ml. The entire population of dextrose repressed cells was induced simultaneously and incubated at room temperature on a rotary shaker for about six hours during which time approximately 4 to 5 cell divisions occurred yielding an induced population of about $1 \times 10^9$ cells per ml. At this point the fully induced cells were producing amylo-1,6-glucosidase.

Four hundred milliliters of the induced cells were transferred to a 12,000 ml. aqueous pH 6.4 production fermenter containing 360 grams pasted waxy maize starch, 1,450 mls. of corn steep liquor, 60 grams of dissolved ammonium acetate, 106 grams of dissolved sodium citrate, 139 mls. 50% aqueous KOH and 150 grams of dissolved potassium chloride. The production batch was aerated in the fermenter for about 47 hours at room temperature. The pH was maintained below 7.9 by adding 80% aqueous acetic acid incrementally after the pH reached 7.9. The amylo-1,6-glucosidase was isolated by precipitation with acetone.

Essentially the same results are obtained by replacing the maltose in the inducing substrate with an equal weight concentration of maltoriose and pullulan. When the maltose was replaced in the inducing substrate with dextrose, amylo-1,6-glucosidase was not formed.

Essentially the same results are obtained using *Aerobacter areogenes* ATCC 9621 and ATCC 15050.

Since many embodiments of this invention may be made and since many changes may be made in the embodiments described, the foregoing is to be interpreted as illustrative only and our invention is defined by the claims appended hereinafter.

We claim:

1. The method of producing amylo - 1,6 - glucosidase comprising the steps of: (1) propagating a culture capable of producing amylo-1,6-glucosidase in an aqueous propagating medium substantially free of maltose, maltotriose and pullulan comprising dextrose as the principal carbohydrate source without forming amylo-1,6-glucosidase, and (2) inducing the cells propagated in step (1) to form amylo-1,6-glucosidase in an aqueous inducing medium containing a carbohydrate inducer selected from the group consisting of maltose, maltotriose, pullulan and mixtures thereof.

2. The process of claim 1, wherein the carbohydrate inducer comprises maltose.

3. The method of claim 2, wherein the inducing medium contains at least 0.5% by weight carbohydrate inducer.

4. The process of claim 1 wherein the culture is propagated at a pH of 5.0 to 8.5 at from 5° C. to 45° C. for about 10 to 72 hours.

5. The method of claim 4 wherein the cells are induced to produce amylo-1,6-glucosidase in an inducing medium maintained at pH 6.0 to 8.1 at a temperature of 5° C. to about 45° C.

6. The method of claim 2 wherein after inducing the cells to form amylo-1,6-glucosidase for about 2-24 hours the induced cells are allowed to further produce amylo-1,6-glucosidase by cultivating the induced cells in a production medium containing amylopectin as a carbon source.

7. The method of claim 5 wherein the culture is derived from *Aerobacter aerogenes* cells.

References Cited

UNITED STATES PATENTS 3,490,995   1/1970   Wallenfels et al. _____ 195—66
3,015,612   1/1962   Pirt et al.

LIONEL M. SHAPIRO, Primary Examiner